United States Patent
Beerana et al.

(10) Patent No.: US 10,346,185 B2
(45) Date of Patent: Jul. 9, 2019

(54) CUSTOMIZABLE AND SHARED THEME MANAGEMENT FOR MEETING ROOM SYSTEMS

(71) Applicant: MICROSOFT TECHNOLOGY LICENSING, LLC, Redmond, WA (US)

(72) Inventors: Somasundaram K. Beerana, Redmond, WA (US); John C. Bradley, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 15/497,922

(22) Filed: Apr. 26, 2017

(65) Prior Publication Data
US 2018/0314391 A1    Nov. 1, 2018

(51) Int. Cl.
| | | |
|---|---|---|
| *H04N 7/14* | (2006.01) | |
| *G06F 9/451* | (2018.01) | |
| *G06F 3/14* | (2006.01) | |
| *H04N 7/15* | (2006.01) | |
| *G06F 9/445* | (2018.01) | |

(52) U.S. Cl.
CPC ............ *G06F 9/452* (2018.02); *G06F 3/1454* (2013.01); *G06F 9/4451* (2013.01); *H04N 7/147* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 6,996,780 B2 | 2/2006 | Estrada | |
| 2003/0160734 A1* | 8/2003 | Rogers | .................. G06Q 30/02 345/2.1 |
| 2006/0123053 A1* | 6/2006 | Scannell, Jr. | ..... G06F 17/30035 |

(Continued)

OTHER PUBLICATIONS

"Custom Themes for Room Displays", https://teem.com/support/eventboard-room-scheduling/custom-themes-for-room-displays, Retrieved Date: Apr. 3, 2017, 18 pages.

(Continued)

*Primary Examiner* — Hien L Duong
(74) *Attorney, Agent, or Firm* — Schwegman Lundberg & Woessner, P.A.

(57) ABSTRACT

Technologies are described for customizable and shared theme management A theme and layout configuration may be provided to a meeting room management device through a shared location such as a shared network storage or manually through a configuration user interface presented by the meeting room management device to allow selection and customization of a theme, a layout of user interface elements, and/or a location of the user interface elements for multiple display devices associated with the meeting room management device. The theme, layout of the user interface elements, and/or location of the user interface elements for each of the display devices may be presented through the configuration, user interface to allow users to see how selected options may be seen on different devices. The theme, layout of the user interface elements, and/or location of the user interface elements may be deployed to each of the display devices.

19 Claims, 9 Drawing Sheets

(56) References Cited

U.S. PATENT DOCUMENTS

| | | | | |
|---|---|---|---|---|
| 2007/0136133 | A1* | 6/2007 | Li | G06Q 30/02 705/14.51 |
| 2008/0184115 | A1* | 7/2008 | Back | G06Q 10/00 715/702 |
| 2008/0263467 | A1* | 10/2008 | Wilkins | G06F 9/4443 715/765 |
| 2009/0083639 | A1 | 3/2009 | McKee Cooper et al. | |
| 2009/0144157 | A1* | 6/2009 | Saracino | G06Q 30/02 705/14.73 |
| 2009/0300028 | A1* | 12/2009 | Ben Natan | G06F 16/00 |
| 2010/0118200 | A1* | 5/2010 | Gelman | G06F 3/041 348/578 |
| 2010/0153839 | A1* | 6/2010 | Wilkins | G06F 17/248 715/235 |
| 2011/0314492 | A1* | 12/2011 | Cassidy | H04N 7/106 725/30 |
| 2012/0179968 | A1* | 7/2012 | Madnick | G06Q 30/02 715/719 |
| 2012/0278408 | A1* | 11/2012 | Seferian | G06Q 10/1095 709/206 |
| 2012/0293605 | A1* | 11/2012 | Seferian | H04N 7/147 348/14.08 |
| 2014/0136935 | A1* | 5/2014 | Santillie | G06F 17/248 715/204 |
| 2014/0181992 | A1 | 6/2014 | Janson et al. | |
| 2014/0344430 | A1* | 11/2014 | Ayanam | H04L 41/0213 709/223 |
| 2014/0362167 | A1* | 12/2014 | Young | H04N 7/15 348/14.08 |
| 2015/0169581 | A1* | 6/2015 | Pusateri | G06F 17/30053 707/737 |
| 2015/0178742 | A1* | 6/2015 | Smith | H04L 67/36 705/7.29 |
| 2016/0165184 | A1* | 6/2016 | Aaron | H04N 7/15 348/14.08 |
| 2016/0259539 | A1* | 9/2016 | Lee | H04W 4/023 |
| 2017/0006162 | A1* | 1/2017 | Bargetzi | H04N 7/147 |
| 2017/0269797 | A1* | 9/2017 | Lavian | H04L 67/10 |
| 2017/0357915 | A1* | 12/2017 | Holmes | G06Q 10/02 |
| 2018/0033050 | A1* | 2/2018 | Jung | G06Q 30/0267 |
| 2018/0060009 | A1* | 3/2018 | Peshkar | G06F 3/1423 |
| 2018/0091568 | A1* | 3/2018 | Edgington, Jr. | H04L 65/4069 |

OTHER PUBLICATIONS

"Stunning, and Functional, Conference Room Displays", https://teem.com/products/meet/conference-room-displays/, Retrieved Date: Apr. 3, 2017, 12 pages.

"Setting Up a Supervised iPad Meeting Room Display", http://www.workscape.io/blog/setting-up-a-ipad-meeting-room-display/, Dec. 12, 2016, 3 pages.

"Conference Room Display Panel", https://www.indoorfinders.com/RDU, Retrieved Date: Apr. 3, 2017, 2 pages.

"Custom Branding for Your Conference Room Displays", https://teem.com/products/meet/custom-conference-room-displays/, Retrieved Date: Apr. 3, 2017, 5 pages.

"Rooms Layout and Interface", https://docs.stage.appspace.com/rooms/2.0/getting-started/layout-interface/, Apr. 5, 2016, 5 pages.

Macinnis, Ryan, "Personalizing Your Conference Room Tablets", https://web-beta.archive.org/web/20160531014936/https:/robinpowered.com/blog/personalize-conference-room-tablets, May 31, 2016, 5 pages.

* cited by examiner

CUSTOMIZABLE AND SHARED THEME MANAGEMENT FOR MEETING ROOM SYSTEMS

BACKGROUND

Meeting spaces with communication and display technologies allow attendees to participate through various modalities in meetings, in person or remotely. With the proliferation in networking and computing technologies, meeting spaces are typically equipped with multiple display devices/systems, audio systems, and networking systems that allow coherent use of different devices and systems. Some meeting space technologies include a controller that may manage the different devices in the meeting space and allow attendees access to the meeting.

Meeting space controllers or meeting room management devices may control multiple display devices, audio devices, sensors, as well as communicate with servers via a network and client devices within the meeting space. When different user interfaces are presented in a multi-device environment for different functionalities, lack of cohesion may degrade user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to personalized theme management for meeting room management devices. In some examples, a theme and layout configuration may be received for a meeting mom management device front a shared location such as a shared network storage. A configuration user interface may be presented by the meeting room management device to allow selection and customization of a theme, a layout of user interface elements, and/or a location of the user interface elements for multiple display devices associated with the meeting room management device. The theme, the layout of the user interface elements, and/or the location of the user interface elements for each of the display devices may be presented through the configuration user interface to allow users, to see how selected options may be seen on different devices. Next, the theme, the layout of the user interface elements, and/or the location of the user interface elements may be deployed to each of the display devices.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
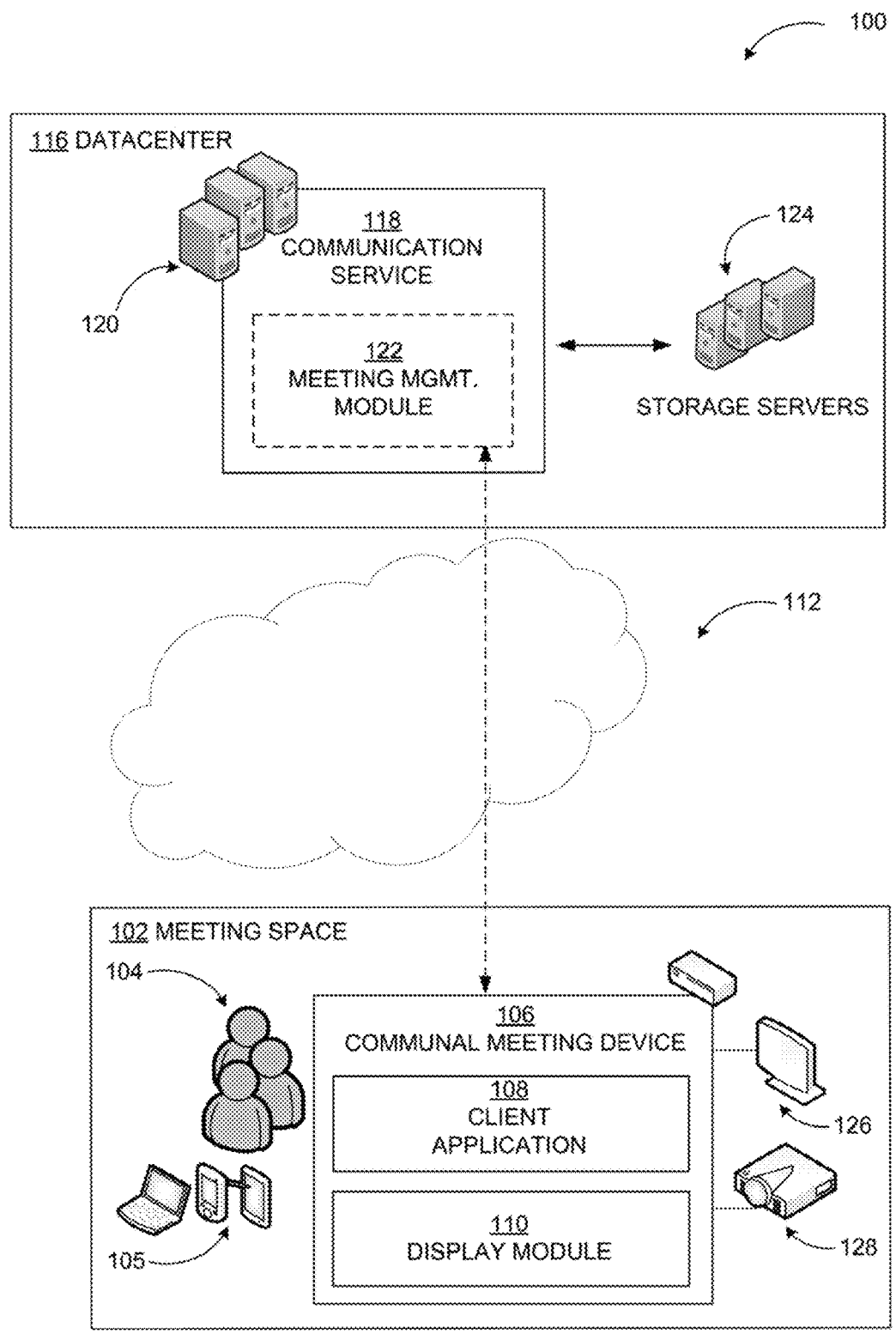
FIG. 1 includes an example network environment where customizable and shared theme management for meeting room systems may be implemented.

As briefly described above, embodiments are directed to customizable and shared theme management for meeting room systems. A theme and layout configuration may be provided to a meeting room management device (also referred to as communal meeting device) through a shared location such as a hared network storage or manually through a configuration user interface presented by the meeting room management device to allow selection and customization of a theme, a layout of user interface elements, and or a location of the user interface elements for multiple display devices associated with the meeting room management device. The theme, the layout of the user interface elements, and/or the location of the user interface elements for each of the display devices may be presented through the configuration user interface to allow users to see, how selected options may be seen on different devices. The theme, the layout of the user interface elements, and/or the location of the user interface elements may be deployed to each of the display devices.

While embodiments are described herein using an example system of a meeting room management device and associated display devices, they are not limited to the example configurations. Customizable and shared theme management may be implemented in other system configurations such as multiple client devices managed by a server, multiple display devices managed by a computer, or display devices and client devices within a meeting room communicatively coupled to a meeting mom management device, for example. Furthermore, the example theme and configurations discussed herein are not intended to be limiting examples. Other themes and configurations such as images, live images, colors, background options, selection and customization options, etc. may be implemented using the principles described herein.

In the following detailed description, references are made to the accompanying drawings that form a part hereof, and in which are shown by way of illustrations, specific, embodiments, or examples. These aspects may be combined, other aspects may be utilized structural changes may be made without departing from the spirit or scope of the present disclosure. The following detailed description s therefore not to be taken in a limiting sense, and the scope of the present invention is defined by the appended claims and their equivalents.

While some embodiments will be described in the general context of program modules that execute in conjunction with an application program that runs on an operating system on as personal computer, those skilled in the art will recognize that aspects may also be cemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can, for example the implemented via one or more of a volatile computer memory, a non-volatile memory, a hard drive, a flash drive, a floppy disk, or a compact disk, and comparable hardware media.

Throughout this specification, the term "platform" may be a combination of software and hardware components for customizable and shared theme management. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where customizable and shared theme management for meeting room systems may be implemented.

As illustrated in diagram 100, an example system may include a datacenter 116 hosting a cloud-based communication service 118 configured to enable users to share content, interact and communicate with one another, create and share calendars, and schedule meetings, among other things, through various communication modes, such as e-mail, text message, call and video conferencing and the like. The datacenter 116 may include one or more processing servers 120 configured to execute the communication service 118, among other components. In some embodiments, at least one of the processing servers 120 may be operable to execute an optional meeting management module 122 of the communication service 118, where the meeting management module 122 may be integrated with the communication service 118 to reserve facilitate meetings that may involve a meeting space 102 for one or more users 104 through a communal meeting device 106 located within the meeting space 102. The datacenter 116 may also include one or more storage servers 124 configured to manage one or more data stores comprising data associated with content stored by the communication service 118 and/or data associated with the meeting management module 122. As described herein, the communication service 118 and/or meeting management module 122 may be implemented as software, hardware, or combinations thereof.

In some embodiments, the communication service 118 may be configured intemperate with various applications to provide its services. For example, as illustrated in the diagram 100, a thin (e.g., a web browser) or a thick (e.g., a locally installed client application) version of a client application 108 may be executed by the communal meeting device 106 with which the communication service 118 may be configured to integrate and interoperate with over one or more networks, such as network 112. The client application 108 may be an application hosted by the communication service 118. The communal meeting device 106 may also include, an interaction module 110 that may be configured to broadcast an identity for the communal meeting device 106, exchange information via short range communication with client devices in the meeting space 102, and provide information to the client application 108 for facilitating a meeting based on interaction with the client devices and/or attendants in the meeting space 102. The communal meeting device 106 may include special purpose device with custom hardware and/or software components, as well as, a desktop computer, a laptop computer, a tablet computer, a smart phone and a wearable computing device with custom components among other similar devices, communication interface may facilitate communication between the communication service 118 and the communal meeting device 106 over the network 112.

The communal meeting device 106 may be coupled to multiple display devices such as display 126 and projector 128. A configuration user interface may be presented by the communal meeting device 106 to allow selection and customization of a theme, a layout of user interface elements, and for a location of the user interface elements for the display devices associated with the communal meeting device 106. The theme, the layout of the user interface elements and/or the location of the user interface elements for each of the display devices may be presented through the configuration user interface to allow users to see how selected options may be seen on different devices. Next, the theme, the layout of the user interface elements, and/or the location of the user interface elements may be deployed to each of the display devices.

As discussed previously, embodiments may also be implemented in other system configurations. For example, the meeting management module 122 executed as part of the communication service 118 may provide customizable and shared theme management to the communal meeting device 106, associated display devices (display 126, projector 128), as well as connected client devices through which meeting user interfaces may be displayed.

Embodiments as described herein, allow a cohesive and efficient pre on of meeting user interfaces in conjunction with meeting rooms and associated display devices through customizable and shared theme management. The enhanced presentation of user interface interaction between the communal meeting device and display devices may reduce processing and memory resources, reduce consumed bandwidth, and increase user interactivity.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of users attending online and physical meetings in conjunction with a meeting room management device.

Figure 2:
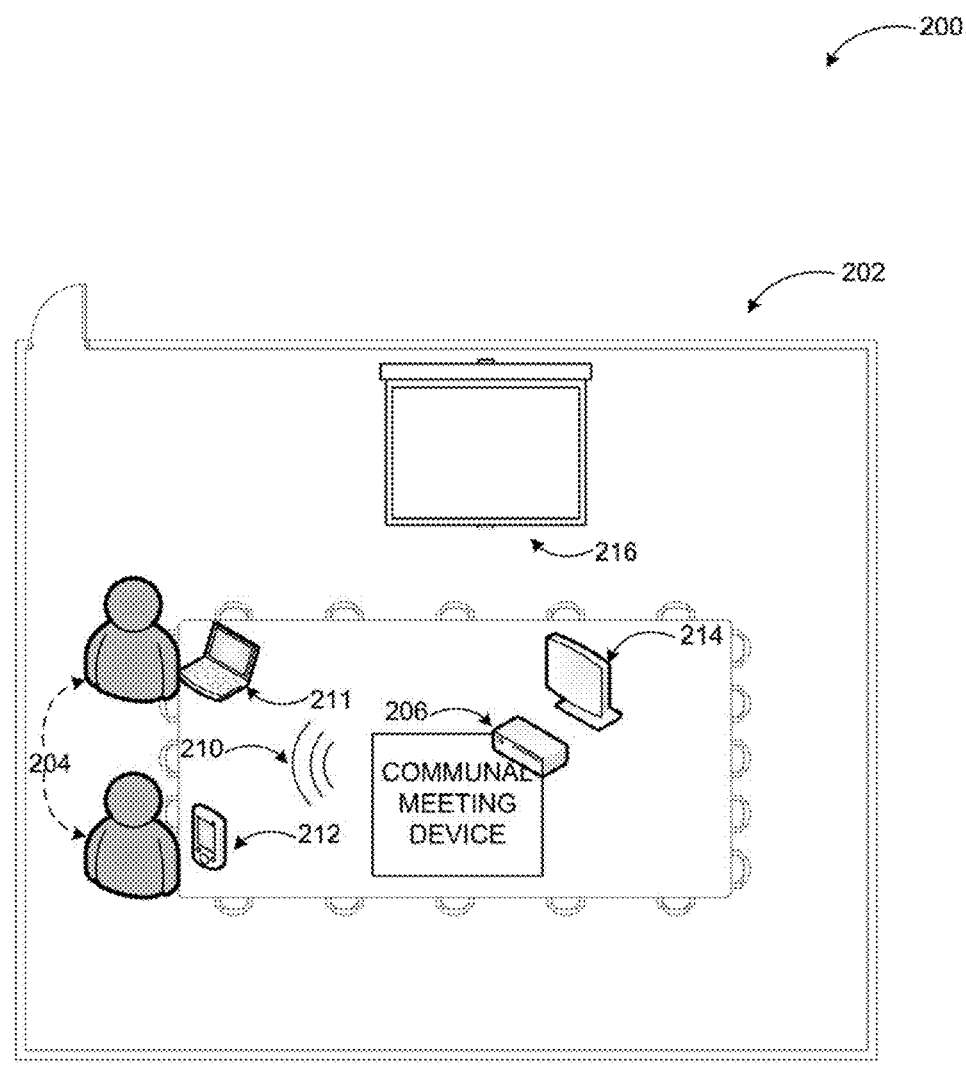
FIG. 2 includes a display diagram of a meeting space, where customizable and shared theme management for meeting room systems may be implemented.

FIG. 2 includes a display diagram of a meeting space, where customizable and shared theme management for meeting room systems may be implemented.

As shown in diagram 200, a meeting space 202 may include a communal meeting device 206 and one or more ancillary devices such as a wall display 216 and standalone display 214. The communal meeting device 206 may be special purpose device or a customized general purpose computing device among other similar devices and be configured to facilitate meetings in conjunction with a communication or meeting service (e.g., communication service 118). The communal meeting device 206 may, for example, manage the ancillary devices in the meeting space 202, provide a user interface to access or initiate a meeting, and manage meeting features such as audio/video controls, presentations, recordings, etc.

According to some embodiments, the communal meeting device 206 may be configured to with a client device within meeting space 202 such as client devices 211 and 212 associated with attendants 204, for example, via wired network connection, wireless network connection, direct wired connection, or short range wireless communication 210 such near field communication (NFC), Bluetooth communication, personal area network (PAN) communication, optical communication, and comparable ones.

By providing customizable and shared theme management, a system according to embodiments may allow users and administrators to customize a background and theme color of their meeting room devices and associated display devices. One or multiple screen layouts may be managed with the ability to set the theme locally, remotely or at scale. An image or similar graphic may be used in multiple places and ways to establish a theme. Groups of devices or all devices may receive the same theme and theme configuration from a share location. Dynamic and/or static portioning and processing of the theme image may be employed for different display devices. Moreover, a configuration user interface may be used to show users how to configure the theme for various display devices. Layout and locations of elements on various meeting related user interfaces may be part of the theme management. The configuration user interface or another user interface may present how the various meeting related user interfaces may look on different display device.

Figure 3:
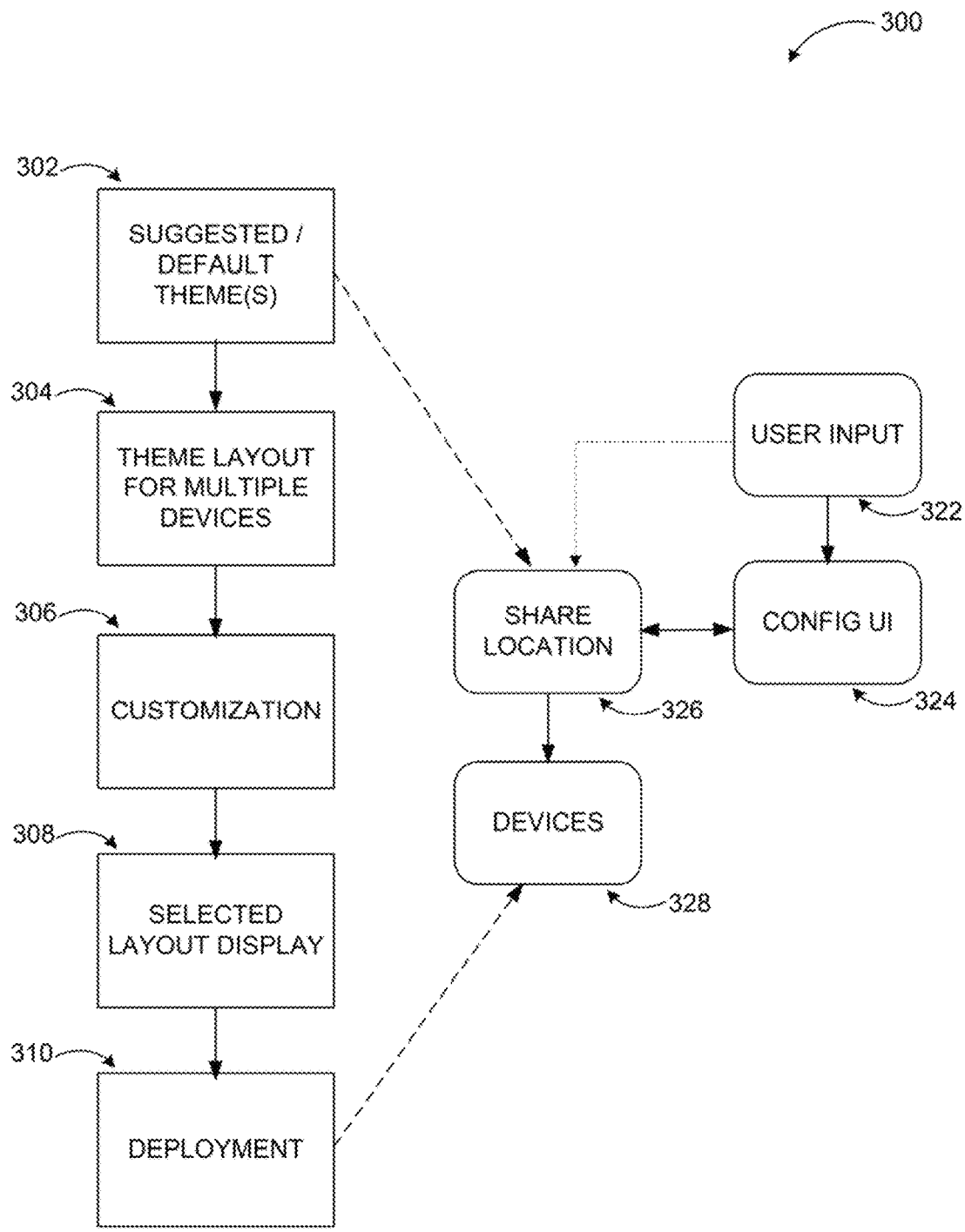
FIG. 3 includes a display diagram of major components and actions in providing customizable and shared theme management for meeting room systems.

FIG. 3 includes a display diagram of major components and actions in providing customizable and shared theme management for meeting room systems.

As shown in diagram 300, a share location 326 (e.g., a network location) may be used to store theme and configuration information for a meeting room management device or a server to receive theme and user interface layout information, and to deploy to various display devices (or client devices in the client device configuration). Suggested or default themes 302 may provide a starting point for the customization of theme management. Based on a default or selected theme, corresponding theme layouts 304 for multiple devices may also, be used. The theme and corresponding layout(s) may be customized (306) by user input 322 (e.g., and administrator or regular user) through a configuration user interlace 324. The user may be allowed to upload an entire configuration (including the theme) to the share location 326, for example through an XML file. The user may also be allowed to select a theme among available themes, upload an image for a custom theme, select layout and location options for various meeting related user interfaces to be displayed on different devices as described herein. A selected/customized theme may be displayed (308) through the configuration user interface 324 or another user interface to allow the user to see how the selected theme configuration may look on the different devices 328. Upon confirmation by the user, the selected/customized theme configuration may be deployed (310) to the various devices 328 such as display devices associated with a meeting room management device, client devices communicatively coupled to the meeting room management devices, etc.

In an example scenario, a meeting room management device may be connected to a wall display, a desktop standalone display, and an integrated device display. The meeting room management device may further be connected via a wireless network to one or more user devices in the meeting room. The integrated device display or one of the user devices may be used to present the configuration user interface for selecting/customizing the theme. The wall display may be used to present meeting content such as images, video, etc. The standalone desktop display may be used to present meeting control user interface to allow users to initiate the meeting, select audio/video/other meeting options, see meeting participant information, etc. A user may select an image as background and a color scheme to complement the selected image. The user may also be allowed to select how the background image and the color scheme is to be proportioned and processed for the different displays. For example, the wall display may use the complete background image, while the other display devices may use a cropped, proportioned, or otherwise processed version of the same image. The color scheme may also be adjusted accordingly. The overall theme may provide a cohesive theme across the multiple devices before, during, and after the meeting. Following figures provide example configurations.

Figure 4A:
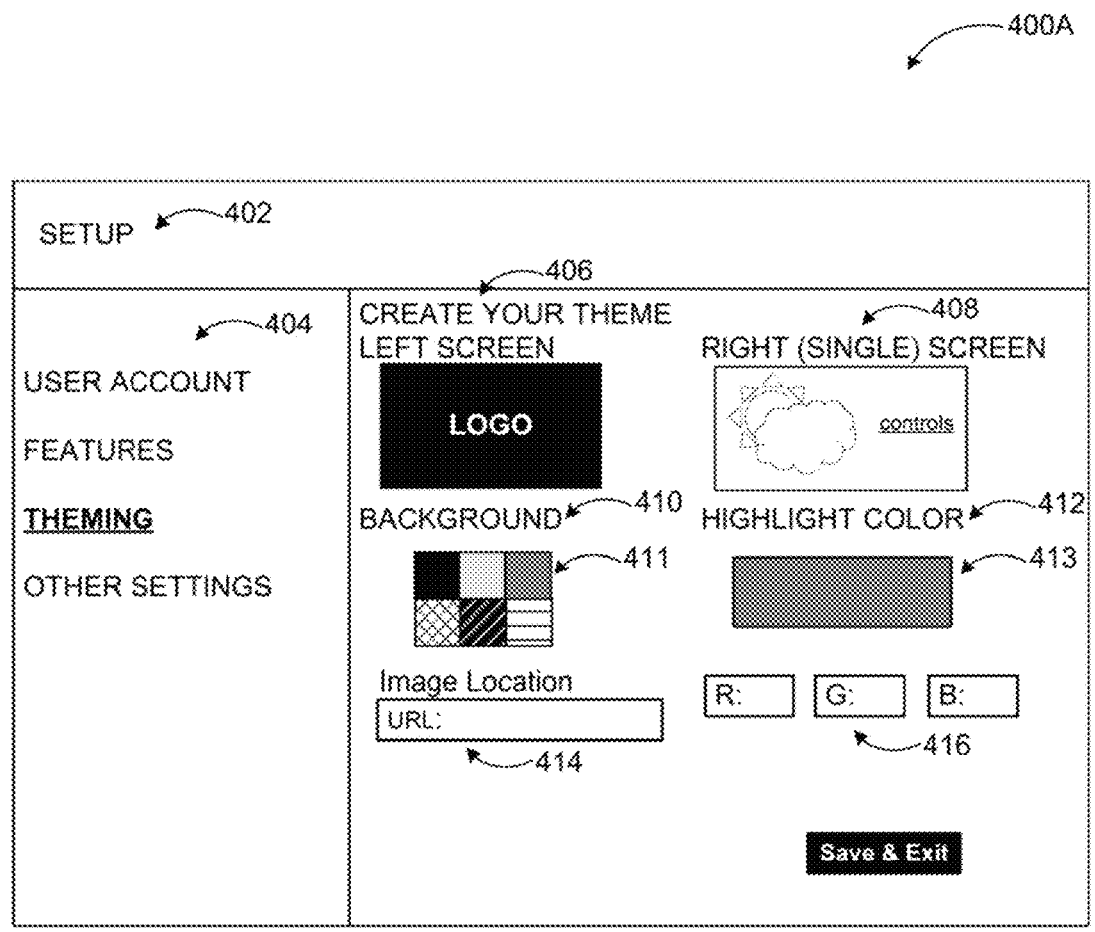
FIGS. 4A and 4B include example user interfaces for configuration of customizable and shared theme management for meeting room systems.
Figure 4B:
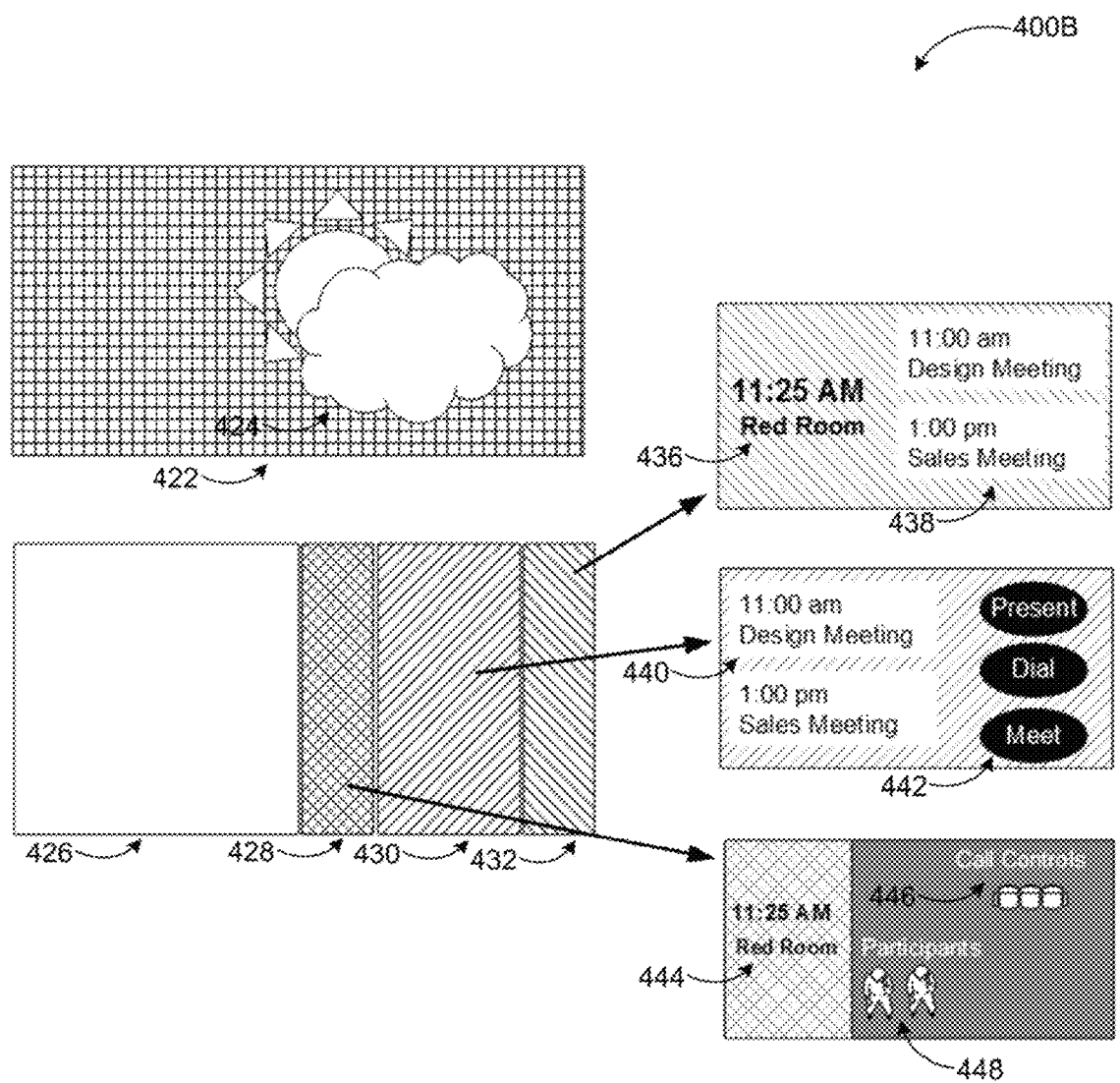

FIGS. 4A and 4B include example user interfaces for configuration of customizable and shared theme management for meeting room systems.

Diagram 400A shows a configuration or setup user interface 402 for a meeting room management device with multiple displays. The example setup user interface 402 in diagram 400A may provide multiple views or tabs 404 to manage user account, features, other settings and theming. In the "theming" tab, a "create your theme" view 406 may be provided allowing users (or administrators) to create a theme that presents a consistent user interface across multiple displays. A background 410 image, color, pattern (411) may be selected from displayed options (defaults) or defined by the user through a location input control 414. In some embodiments, images may also be defined through a drag-and-drop operation. In a two-screen configuration, the left and right screens 408 (displays) may be displayed on the configuration user interface. In other configurations, more displays may be presented. Highlight color(s) 412 may be selected through a color palette element 413 or by defining color components 416 (e.g., R, G, B).

Diagram 400B shows how selected images and colors may be used to create the different screens on different displays associated with the meeting room management device. Users may select or upload an image 422, which may have a core element 424 and empty space (or other pattern) around it. Depending on the content of the selected or uploaded image, portions of the image 426, 428, 430, and 432 may be selected and processed for use in various displays. The selection and processing may focus on the core element 424 to provide a consistent presentation of the selected theme across display devices.

In a display that shows a summary of meetings 438 scheduled in a meeting room and time 436, there may be an abundance of empty display area. Thus, the core element may be displayed more prominently. As mentioned above, a portion of the selected or uploaded image may be used in a processed fashion (e.g. stretched, shrunk, rotated, etc.) along with varying degrees of transparency and/or color highlighting for display devices that present different content. For example, a stretched and less prominent version of a portion of the core element may be used in a display that presents the scheduled meetings 440 and meeting controls 442 as the focus of this type of display is typically the controls.

In another example, meeting controls 446 and meeting participant information 448 may be presented over a single color background, while a portion of the core element may be displayed, cropped and scaled as background for the time and mom identifier 444. In some example configurations, the core element, of the image may span top two screens and fill a bottom screen's background slots. Templates and best practice guides may be provided to ensure proper placement of user interface elements in relation to the image (or portions of the image), contrasting, and compliance with accessibility standards. Using a configuration system according to embodiments, themes may be set up, deployed, and updated efficiently and in a user friendly manner across an organization.

Figure 5:
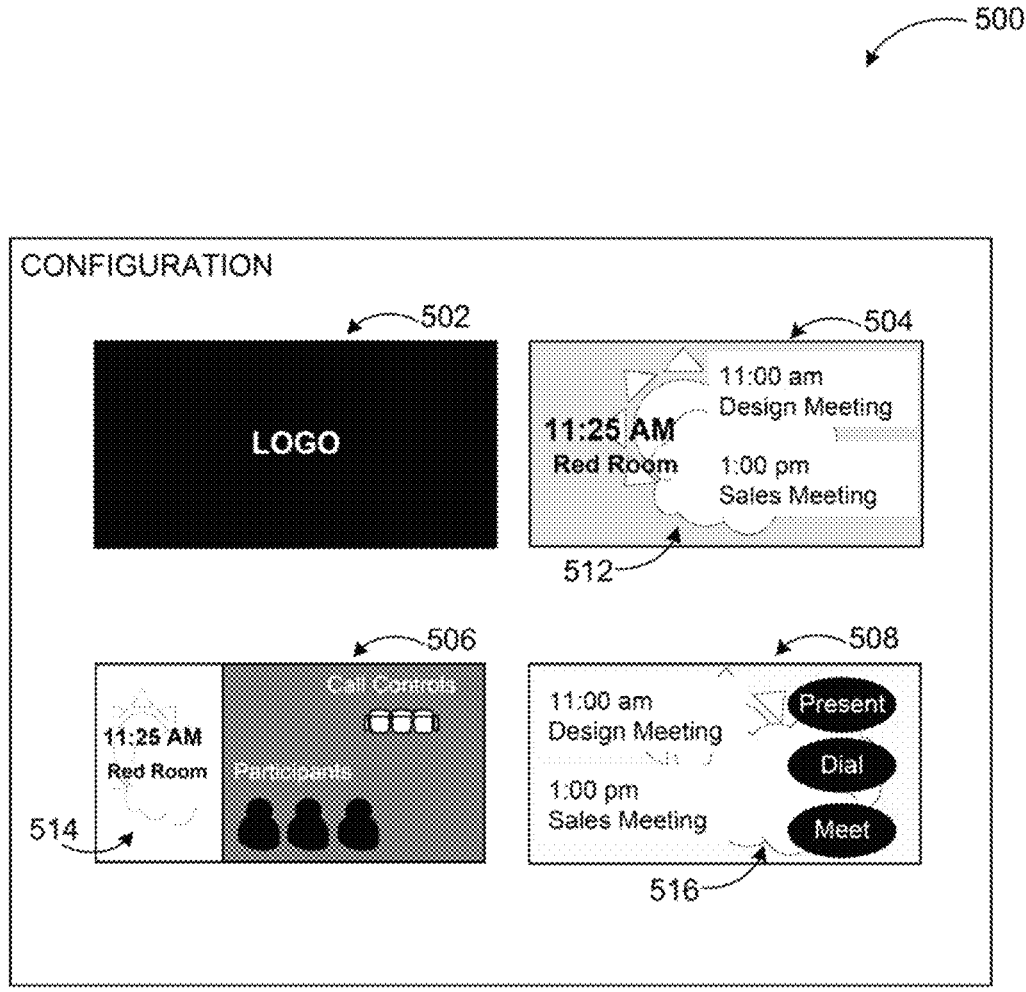
FIG. 5 includes another example user interface for customizable and shared theme management for meeting room systems.

FIG. 5 includes another example user interface for customizable and shared theme management for meeting room systems.

As shown in diagram 500, the configuration user interface may also display to a user (or administrator) how the theme may look on different display devices. A wall screen 502 may show the entire selected or uploaded image (for example, a corporate logo). The image 512 may be shown in a less prominent manner (e.g. transparent or lighter background color) on a display device 504 that presents summary information such as partial schedule of meetings, time, and room identifier. The image may be shown in a stretched and/or cropped manner (516) on a display device 506 that presents partial schedule and meeting controls. In yet another example, a cropped and scaled version of the image (514) may be shown as background for time and room identifier, whereas meeting controls, participant information, etc. may be shown over an opaque background.

Users or administrators may be allowed to select among a variety of preset themes or create their own theme. In a simple example, they may select one image and one color. The system may automatically proportion the image and set colors for the different display devices. In some examples, an organizational default theme may be provided and users allowed to customize that default theme for different groups of devices. This way, users or administrators may be provided with flexibility to deploy a new theme or update an existing theme and scale across an organization.

The examples provided in FIGS. 1 through 5 are illustrated with specific systems, services, applications, modules, and notifications. Embodiments are not limited to environments according to these examples. Customizable and shared theme management for meeting room systems may be implemented in environments employing fewer or additional systems, services, applications, modules, and notifications. Furthermore, the example systems, services, applications, modules, and notifications shown in FIG. 1 through 5 may be implemented in a similar manner with other values using the principles described herein.

Figure 6:
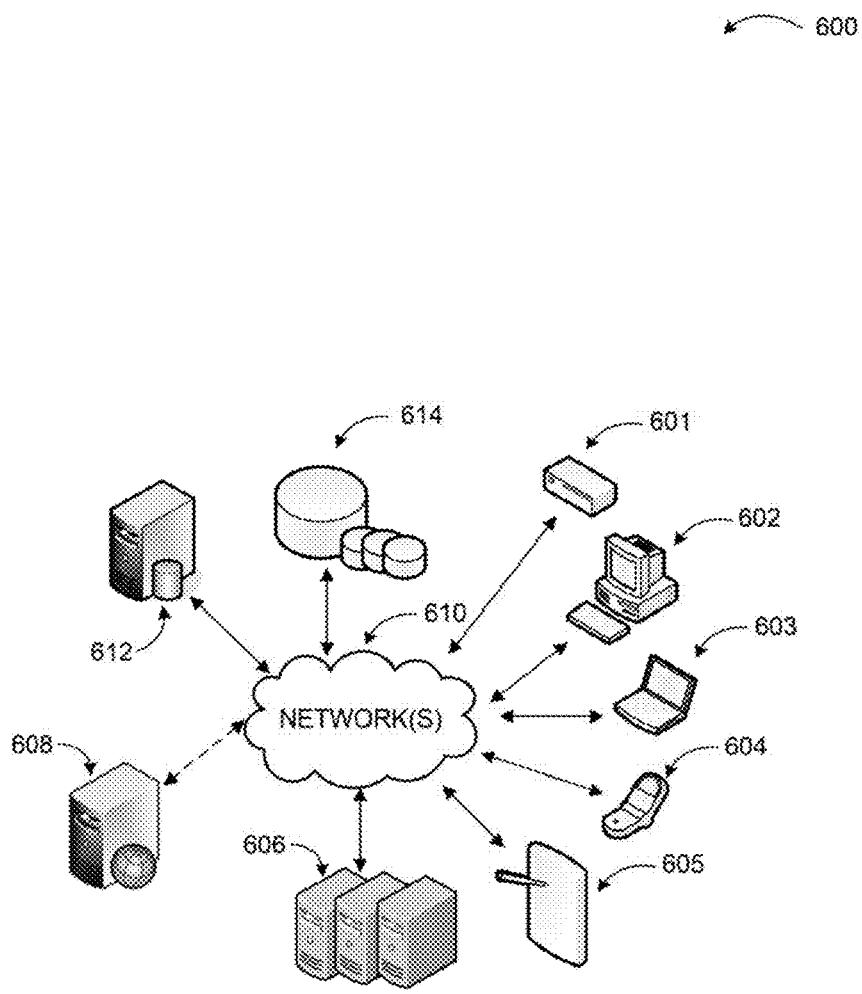
FIG. 6 is a networked environment, where a system according to embodiments may be implemented.

FIG. 6 is a networked environment, where a system according to embodiments may be implemented. In addition to locally installed applications (for example, client application 108), a meeting management module may also be employed in conjunction with hosted applications and services (for example, a communication service 118) that may be implemented via software executed over one or more servers 606 or individual server 608, as illustrated in diagram 600. A hosted service or application may communicate with client applications on individual computing devices such as a communal meeting device 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not network(s) 610 may include wireless media such as acoustic, RF, infrared and other wireless media.

Many other configurations of computing devices, applications, engines, data sources, and data distribution systems may be employed for customizable and shared theme management for meeting room systems. Furthermore, the networked environments discussed in FIG. 6 are for illustration purposes only. Embodiments are not limited to the example applications, engines, or processes.

Figure 7:
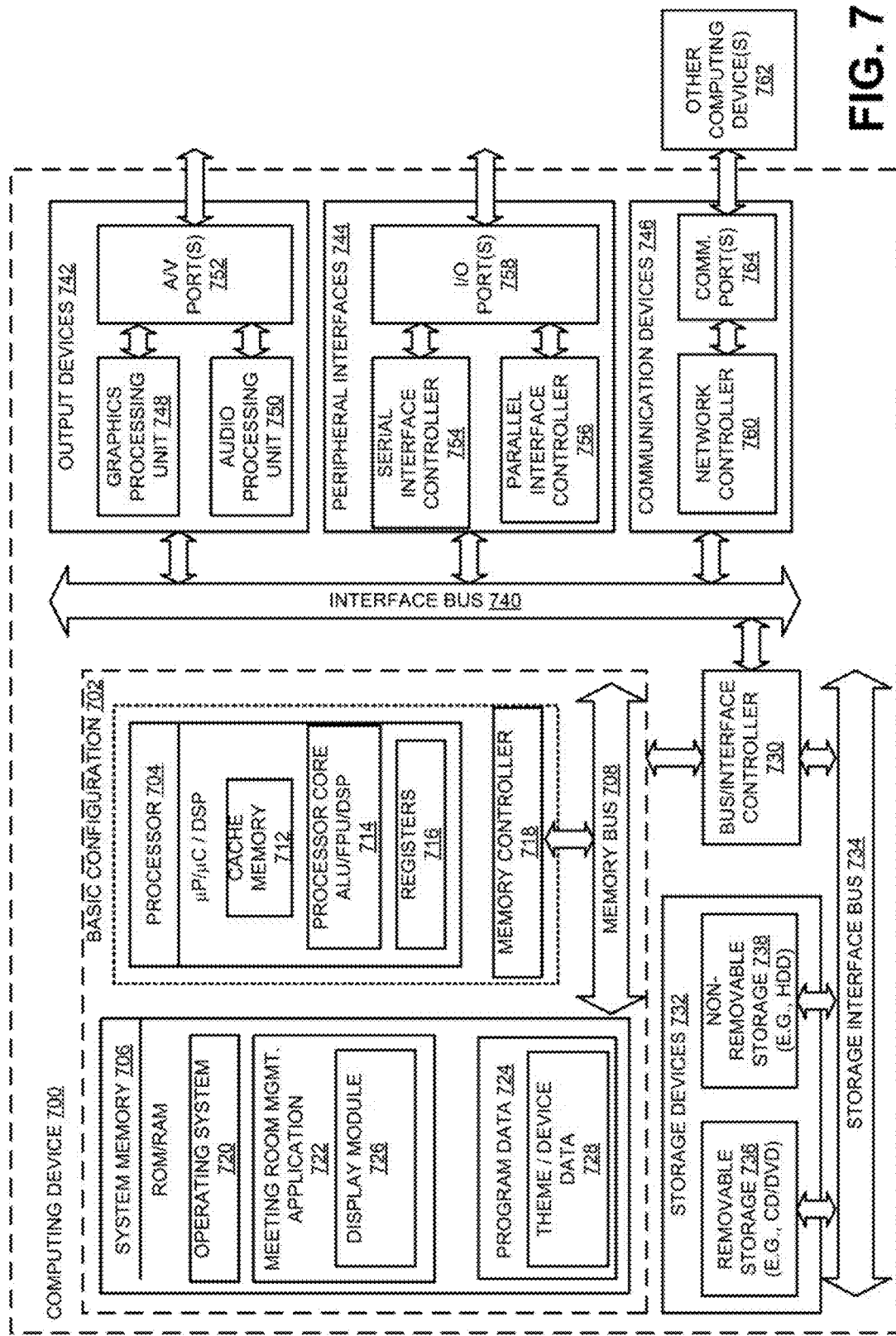
FIG. 7 is a block diagram of an example communal meeting device, in accordance with some embodiments.

FIG. 7 is a block diagram of an example communal meeting device, in accordance with same embodiments.

For example, computing device 700 may be a communal meeting device, where the communal meeting device may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a meeting room management application 722 associated with a communication service, and program data 724. The meeting room management application 722 may include a display module 726. The meeting room management application 722 may receive a theme and layout configuration from a shared location such as a shared network storage. A configuration user interface may be presented by the display module 726 to allow selection and customization of a theme, a layout of user interface elements, and/or a location of the user interface elements for multiple display devices associated with the communal meeting device. The theme, the layout of the user interface elements, and/or the location of the user interface elements for each of the display devices may be presented through the configuration user interface to allow users to see how selected options may be seen on different devices. Next, the theme, the layout of the user interface elements, and/or the location of the user interface elements may be deployed to each of the display devices. The program data 724 may include, among other data, theme/device data 728, such as background image, color scheme, portioning and/or processing parameters, etc., as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interlace controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a specialized server, mainframe, or similar computer that includes any of the above functions. The computing device 700 may also be implemented as a personal computer including both laptop computer and non-laptop computer configurations.

Example embodiments may also include methods for customizable and shared theme management. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
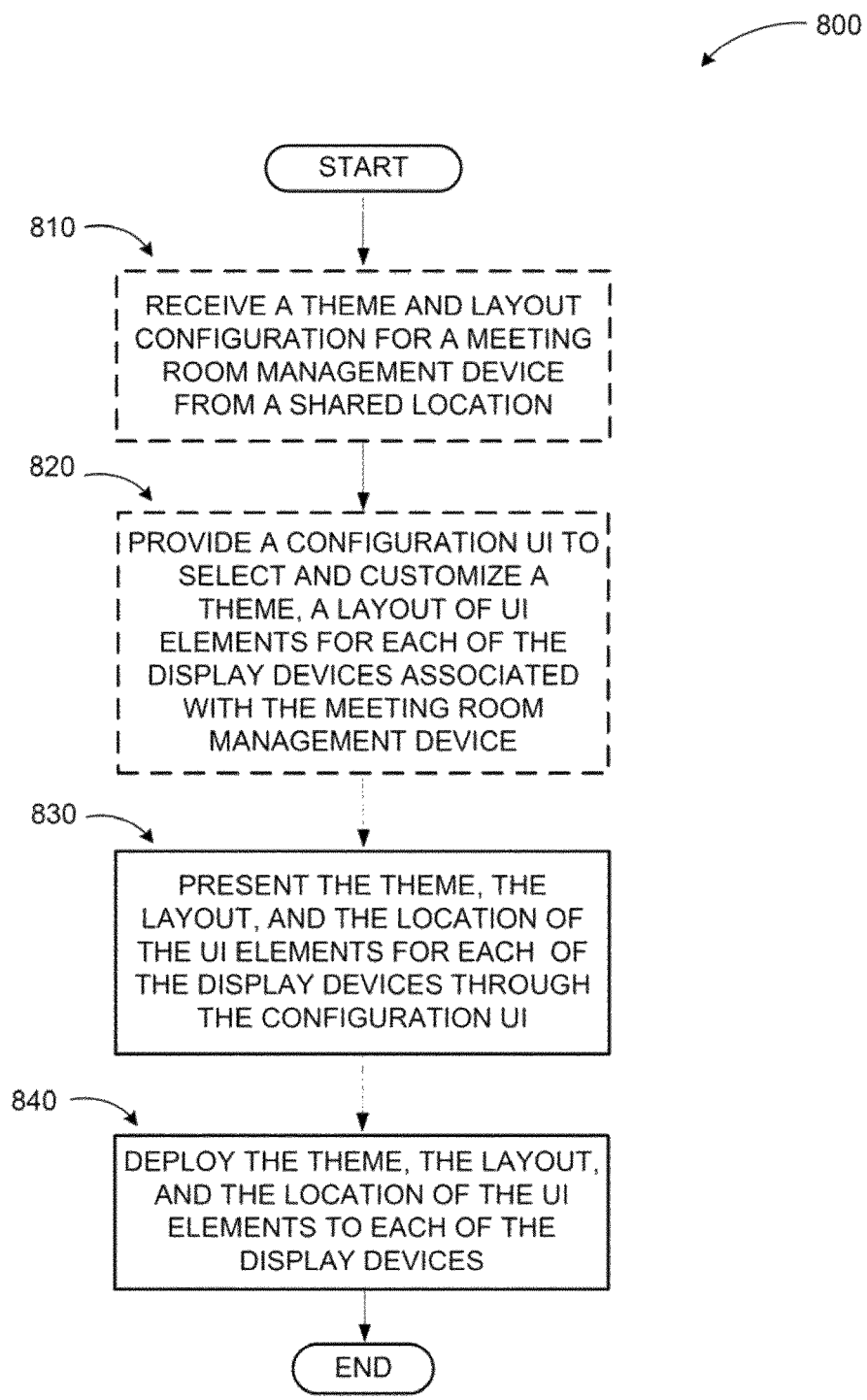
FIG. 8 illustrates a logic flow diagram of a method for customizable and shared theme management for meeting room systems, according to embodiments.

FIG. 8 illustrates a logic flow diagram of a method for customizable and shared theme management for meeting room systems, according to embodiments.

Process 800 may be implemented on a computing device, server, or other system. An example system may include a server configured to execute a communication service and a communal meeting device configured to manage meetings in a meeting space for attendees. The communal meeting device may include a communication interface to facilitate communication between the communication service and the communal meeting device, a memory to store instructions, and one or more processors coupled to the memory.

Process 800 may begin with either operation 810 or 820. At operation 810, a theme and layout configuration may be received for a meeting room management device from a shared location such as a shared network storage. The information may be received over standard network communication pathways or over specific APIs (e.g., an XML or similar file upload). At operation 820, a configuration user interface may be presented by the meeting room management device (through a display device) to allow selection and customization of a theme, a layout of user interface elements, and/or a location of the user interface elements for multiple display devices associated with the meeting room management device.

At operation 830, the theme, the layout of the user interface elements, and/or the location of the user interface elements for each of the display devices may be presented through the configuration user interface to allow users to see how selected options may be seen on different devices. At operation 840 the theme, the layout of the user interface elements, and/or the location of the user interface elements may be deployed to each of the display devices.

The operations included in process 800 are for illustration purposes. Customizable and shared theme management for meeting room systems may be implemented by similar processes with fewer or additional steps, as well as in different order of operations using the principles described herein. The operations described herein may be executed by one or more processors operated on one or more computing devices, one or more processor cores, and/or one or more specialized processing devices, among other examples.

According to examples, a means for providing personalized theme management for meeting room management devices is described. The means may include a means for receiving a theme and a layout configuration for a meeting room management device from a shared location; a means for providing a configuration user interface for selection and customization of one or more of the theme, a layout of user interface elements, and a location of the user interface elements for each of a plurality of display devices associated with the meeting room management device; a means for presenting the selected and customized theme, layout of the user interface elements, and location of the user interface elements for each of the plurality of display devices through the configuration user interface; and a means for deploying the selected and customized theme, layout of the user interface elements, and location of the user interface elements for each of the plurality of display devices to the plurality of display devices.

According to some examples, a method for providing personalized theme management for meeting room management devices is described. The method may include receiving a theme and a layout configuration for a meeting room management device from a shared location; providing a configuration user interface for selection and customization of one or more of the theme, a layout of user interface elements, and a location of the user interlace elements for each of a plurality of display devices associated with the meeting room management device; presenting the selected and customized theme, layout of the user interface elements, and location of the user interface elements for each of the plurality of display devices through the configuration user interlace; and deploying the selected and customized theme, layout of the user interface elements, and location of the user interface elements for each of the plurality of display devices to the plurality of display devices.

According to other examples, the method may also include enabling a user to select and customize the theme, the layout of user interface elements, and the location of the user interface elements locally through the meeting room management device or remotely through a client device communicatively coupled to the meeting room management device. The method may further include enabling a user to upload an image to be used in the selected and customized theme. The method may also include dynamically and/or statically portioning and processing of the uploaded image for each of the plurality of display devices. Dynamically and/or statically portioning and processing of the uploaded image may include one or more of cropping, stretching, shrinking, and modifying a transparency of the uploaded image for each of the plurality of display devices. Dynamically and/or statically portioning and processing of the uploaded image may also include portioning and processing the uploaded image for each of the plurality of display devices based on one or more of a content displayed by and a type of each of the plurality of display devices. The method may further include selecting a background color and a highlighting color to complement a theme image. The method may also include employing one or more of a highlighting scheme, a graphic scheme, a textual scheme, and a shading scheme.

According to other examples, a meeting room management device to provide personalized theme management is described. The meeting room management device may include a communication interface configured to facilitate communication between one or more servers executing a communication service and the meeting room management device; a memory configured to store instructions; and one or more processors coupled to the memory and the communication interface, where the one or more processors, in conjunction with the instructions stored in the memory, are configured to receive a theme and a layout configuration from a shared location; provide a configuration user interface for selection and customization of one or more of the theme, a layout of user interface elements, and a location of the user interface elements for each of a plurality of display devices associated with the meeting room management device; present the selected and customized theme, layout of the user interface elements, and location of the user interlace elements for each of the plurality of display devices through the configuration user interface; and deploy the selected and customized theme, layout of the user interface elements, and location of the user interface elements for each of the plurality of display devices to the plurality of display devices.

According to some examples, the display devices may include a wall display, a desktop standalone display, and an integrated device display. The integrated device display may be a display integrated with a client device that is communicatively coupled to the meeting room management device. The meeting room management device may be configured to deploy the selected and customized theme, layout of the user interface elements, and location of the user interface elements for each of the plurality of display devices to the plurality of display devices, via one or more of a short range wireless communication medium, a long range wireless communication medium, a wired communication medium, and an optical communication medium. The one or more processors may be further configured to portion and process an uploaded image for each of the plurality of display devices based on one or more of a content displayed by and a type of each of the plurality of display devices; and/or combine the portioned and processed image with one or more of a background color and a highlighting, color for each of the plurality of display devices based on one or more of the content displayed by and the type of each of the plurality of display devices. The content displayed by each of the plurality of display devices may include one or more of meeting controls, meeting content, meeting participant information, and summary information associated with a meeting room.

According to further examples, a system for providing personalized theme management to a plurality of computing devices is described. The system may include a first server configured to execute a communication service and a second server. The second server may include a communication interface configured to facilitate communication between the first server, the second servers, and the plurality of computing devices; a memory configured to store instructions; and one or more processors coupled to the memory and the communication interface. The one or more processors, in conjunction with the instructions stored in the memory, may be configured to receive a theme and a layout configuration from a shared network location; provide a configuration user interface to be displayed by one of the plurality of computing devices for selection and customization of one or more, of the theme, a layout of user interface elements, and a location of the user interface elements for each of the plurality of computing devices; provide the selected and customized theme, layout of the user interface elements, and location of the user interface elements for each of the plurality of computing devices to be displayed through the configuration user interface; and deploy the selected and customized theme, layout of the user interface elements, and location of the user interface elements for each of the plurality of computing devices to the plurality of computing devices.

According to yet other examples, the one or more processors may be further configured to deploy the selected and customized theme, layout of the user interface elements, and location of the user interface elements for each of the plurality of computing devices to one of a subset of the plurality of computing devices and all of the plurality of computing devices. The theme may be an organizational default theme and the selection and the customization may be performed based on a type of each computing device, a user associated with each computing device, or an organizational unit associated with one or more of the plurality of computing devices. The one or more processors may also be configured, to allow an administrator to update and to scale a default theme for computing devices associated with an organization. The one or more processors may be configured to receive the theme and the layout configuration from the shared network location through one of a predefined application programming interface (API) and a standard network communication.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for providing personalized theme management for meeting room management devices that manage an online meeting in a meeting space by controlling meeting devices, the method comprising:
   receiving a theme and a layout configuration for a meeting room management device from a shared location;
   providing a configuration user interface for selection, and customization of one or more of the theme, a layout of user interface elements, and a location of the user interface elements for each of a plurality of display devices associated with the meeting room management device;
   presenting the selected and customized theme, layout of the user interface elements, and location of the user interface elements for each of the plurality of display devices through the configuration user interface; and
   deploying the selected and customized theme, layout of the user interface elements, and location of the user interface elements for each of the plurality of display devices to the plurality of display devices.

2. The method of claim 1, further comprising:
   enabling a user to access the configuration user interface locally through the meeting room management device or remotely through a client device communicatively coupled to the meeting room management device.

3. The method of claim 1, further comprising:
   enabling a user to upload the image.

4. The method of claim 1, further comprising:
   processing a first copy of the image for the first display device in a first manner and processing a second copy of the image for the second display device in a second manner.

5. The method of claim 4, wherein processing the first copy of the image comprises:
   one or more of cropping, stretching, shrinking, and modifying a transparency of the first copy of the image.

6. The method of claim 1 further comprising:
   selecting a background color and a highlighting color to complement the image.

7. The method of claim 6, further comprising:
   employing one or more of a highlighting scheme, a graphic scheme, a textual scheme, and a shading scheme.

8. A meeting room management device to provide personalized theme management, the meeting room management device comprising:
   a processor; and
   a memory, the memory storing instructions, which when executed by the processor, cause the processor to perform operations comprising:
   providing a configuration user interface, and receiving through the configuration user interface, a selection of of a selected theme and a selected layout applicable to first and second display devices associated with the meeting room management device, the selected theme specifying visual elements including an image and the selected layout specifying a placement of a plurality of meeting control elements, the selected theme and layout specifying that the first display device display a first meeting control element and a first portion of the image and the second display device display a second meeting control element and a second portion of the image; and
   causing display of the selected theme and layout on the first and second display devices.

9. The meeting room management device of claim 8, wherein the first display device is one of: a wall display, a desktop standalone display, or an integrated device display.

10. The meeting room management device of claim 9, wherein the integrated device display is a display integrated with a client device that is communicatively coupled to the meeting room management device.

11. The meeting room management device of claim 8, wherein the operations of causing display of the selected theme and layout comprises transmitting information about the selected theme and layout to the first display device via one or more of a short range wireless communication medium, a long range wireless communication medium, a wired communication medium, and an optical communication medium.

12. The meeting room management device of claim 8, wherein the operations further comprise:
   processing a first copy of the image for the first display device in a first manner and processing a second copy of the image for the second display device in a second manner.

13. The meeting room management device of claim 12, wherein processing the first copy comprises:
   combining the first copy of the image with one or more of a background color and a highlighting color based on one or more of content displayed by the first display device.

14. The meeting room management device of claim 12, wherein content displayed by the first and second display devices includes one or more of meeting controls, meeting content, meeting participant information, and summary information associated with a meeting room.

15. A computing device comprising:
   means for providing a configuration user interface, and receiving through the configuration user interface, a selection a selected theme and a selected layout applicable to first and second display devices associated with the computing device, the selected theme specifying visual elements including an image and the selected layout specifying a placement of a plurality of meeting control elements, the selected theme and layout specifying that the first display device display a first meeting control element and a first portion of the image and the second display device display a second meeting control element and a second portion of the image; and
   means for causing display of the selected theme and layout on the first and second display devices.

16. The computing device of claim 15, wherein the first display device is a user computing device.

17. The computing device of claim 15, wherein the selected theme is an organizational default theme and the means for selection is performed based on a type of each of the first and second display devices, a user associated with each of the first and second display devices, or an organizational unit associated with the first or second display devices.

18. The system-computing device of claim 15, wherein the computing device further comprises:
   means for allowing an administrator to update and to scale a default theme for first and second computing devices.

19. The computing device of claim 15, further comprising:
   means for receiving the theme from a shared network location through one of a predefined application programming interface (API) and a standard, network communication.

* * * * *